April 16, 1957 — L. T. FLEMING — 2,789,225

SWEEP SIGNAL GENERATOR

Filed July 29, 1954 — 3 Sheets-Sheet 1

INVENTOR.
LAWRENCE T. FLEMING

BY Dos T. Hatfield

ATTORNEY

INVENTOR.
LAWRENCE T. FLEMING
BY Don T. Hatfield
ATTORNEY

April 16, 1957 L. T. FLEMING 2,789,225

SWEEP SIGNAL GENERATOR

Filed July 29, 1954 3 Sheets-Sheet 3

INVENTOR
LAWRENCE T. FLEMING
BY Dos T. Hatfield
ATTORNEY 2,789,225

SWEEP SIGNAL GENERATOR

Lawrence T. Fleming, Falls Church, Va., assignor to Heath Company, Benton Harbor, Mich.

Application July 29, 1954, Serial No. 446,606
12 Claims. (Cl. 250—36)

The present invention relates to sweep signal generators, and more particularly to sawtooth oscillator circuits for generating a sweep voltage of sawtooth waveform for use in providing the horiztonal deflection of cathode-ray oscilloscopes or the like.

Many so-called sawtooth oscillator circuits are known. One well-known sawtooth oscillator consists of a capacitor charging and discharging circuit including a form of multi-vibrator capacitor charging control circuit as devised by Puckle and disclosed in the reference "Time Bases" by Puckle, published March 1943, page 31. A disadvantage of the Puckle circuit when it is to be used for precision sweep circuits is its frequency instability in response to variations in supply voltages and tube characteristics.

An object of this invention is to provide an improved form of sawtooth oscillator circuit embodying a self-regulating circuit that will automatically compensate for minor variations in voltage of the voltage supply and characteristics of the control tube in a manner to maintain the frequency of the sawtooth output voltage at any one of a desired frequency over a wide range of frequencies notwithstanding the variations of the voltage supply.

Another object of this invention is to provide an improved form of sawtooth oscillator circuit that will generate sweep voltages having a waveform of sharply rising and linearly declining voltage cycles useful in the sweep circuits of cathode-ray oscilloscopes and will be relatively insensitive to variations in operating supply voltages while at the same time providing an extremely short time interval for the sharply rising voltage cycles between the generation of successive linearly declining sweep voltage cycles.

Another object is to provide an improved sawtooth oscillator in combination with a retrace blanking amplifier coupled to said oscillator in a novel manner to improve the sharpness of the blanking pulses and minimize reaction effects upon the oscillator.

Further objects, features and the attending advantages of the invention will be apparent with reference to the following specification and drawings, in which.

Figure 1:
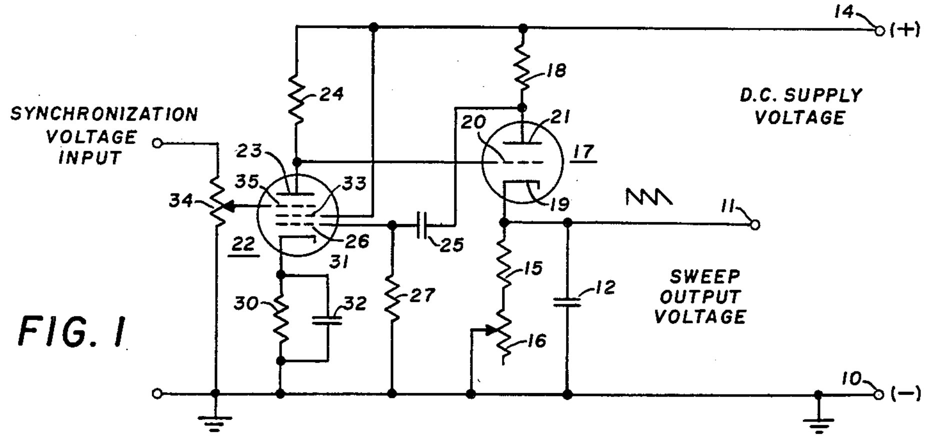
Fig. 1 is a simplified schematic view of one form of the invention.

Referring to the drawings, it will be understood that, for the sake of simplicity, the tube heater circuits and the power supply for obtaining the direct current supply voltage have not been shown and that any conventional known circuits for these purposes may be used.

As shown by Fig. 1 of the drawings, the sawtooth sweep output voltage to be generated will appear across terminals 10 and 11 and the output capacitor 12. Terminal 10 is also connected to chassis ground and the negative terminal of the direct current power supply. The positive terminal of the power supply is shown at 14. Connected in parallel with the capacitor 12 is a resistance network comprised of a fixed resistance 15 and an adjustable resistance 16. Either the resistance 16 may be varied or the value of the capacitor 12 may be changed, or both, to vary the time constant of the capacitor-resistance network, and hence the frequency of the sweep output signal to be produced in the manner to be described. The capacitor 12 is connected to be charged in series with the charging tube 17 and the anode resistance 18 from the terminals 10 and 11 of the direct-current supply voltage in a manner such that the capacitor 12 will be charged when the tube 17 is conductive. When the tube 17 is cut off and not conducting, the capacitor 12 will discharge through the resistances 15, 16 and the parameters of the circuit are chosen to provide a linear variation of declining voltage across the capacitor 12 while discharging from its maximum to its minimum voltage conditions.

When the capacitor 12 is initially discharged and the circuit is first connected for operation, the cathode electrode 19 of the charging tube 17 will be essentially at the potential of the negative terminal 10. The control electrole 20 of tube 17 is directly connected to the anode electrode 23 of a control tube 22 and through the anode resistance 24 to the positive terminal 14 of the direct current supply. Under such conditions, at the start of the circuit operation, the control tube 22 is not conducting and the charging tube 17 will become conductive to start the charging of the sweep voltage output capacitor 12. As the tube 17 conducts, the voltage at its anode, electrode 21 is lowered by the drop across its anode resistance 18 and this drop of voltage is reflected through the coupling capacitor 25 to the control electrode 26 of control tube 22, thus maintaining tube 22 in the non-conducting condition. When the output capacitor 12 is fully charged to its maximum potential as determined by the circuit parameters, the cathode electrode 19 becomes sufficiently positive to cut off the charging tube 17 and the capacitor 12 begins its linear discharge through resistors 15, 16. Charging tube 17 remains cut off during the discharge of capacitor 12 and the voltage at its anode 21 therefore rises to increase the positive potential on the control electrode 26 of control tube 22 to cause this tube to become conductive while tube 17 is non-conductive. Therefore the voltage at the anode 23 of tube 22 is lowered by the voltage drop across its anode resistor 24 and since the anode electrode 23 is directly connected to the control electrode 20 of charging tube 17, the charging tube is maintained cut off until the capacitor 12 discharges to the minimum voltage at which the bias relations between cathode 19 and control electrode 20 will allow the charging tube 17 to again become conductive.

It will be seen that variations in potential of the supply voltage for the control tube 22 will cause corresponding variations of the bias conditions for the charging tube 17 and hence a variation in frequency of the relaxations of output capacitor 12. According to this invention, a self-bias resistance 30 is inserted in series with the cathode electrode 31 of the control tube 22 to provide a regulation of the potential at the anode 23 of the control tube 22 when the latter is conducting. Thus the bias on the control electrode 20 when the charging tube is cut off is automatically maintained substantially constant notwithstanding minor variations of direct current supply potential. The voltage to which the capacitor 12 discharges, the period of time in which it discharges, and the frequency of the output saw tooth signal are thus maintained substantially constant even if the potential of the voltage source should fluctuate. It has also been found, according to this invention, that a by-pass capacitor 32 may be connected in parallel with the bias resistance 30, and this improves the speed of response of the control tube when it is becoming non-conductive as the charging tube 17 becomes conductive. When the charging tube 17 starts to conduct again, the potential at its anode 21 is lowered to reflect a lower positive grid bias on the control electrode 26 of control tube 22, causing the control tube to become non-conductive, which therefore raises the potential at its anode 23 and the control electrode 20 of charging tube 17, making the charging tube 17 even more conductive. When the capacitor 12 is again fully charged, the cycle is repeated. Of course, the faster that the control tube 22 can be cut off, the faster the charging tube 17 will charge the sweep output capacitor 12, and hence the rise or retrace time of the sawtooth voltage output will be steeper and quicker. Therefore, the provision of the by-pass capacitor 32 for the self-bias resistor 30 of the control tube 22 will be advantageous when extremely short retrace times are desired.

As shown by Fig. 1 of the drawings, the control tube 22 may be a multi-grid tube having a screen electrode 33 connected to the positive terminal 14 of the voltage supply. When the circuit is to be used to supply sweep voltage for a cathode-ray oscilloscope, a synchronization signal may be connected through a potentiometer 34 to the suppressor electrode 35 of the control tube 22, thus providing synchronization signal injection for the usual purposes. Also, as shown, the control electrode 26 of control tube 22 is provided with the usual grid return resistance 27 connected to the negative terminal 10 of the direct current supply.

Figure 2:
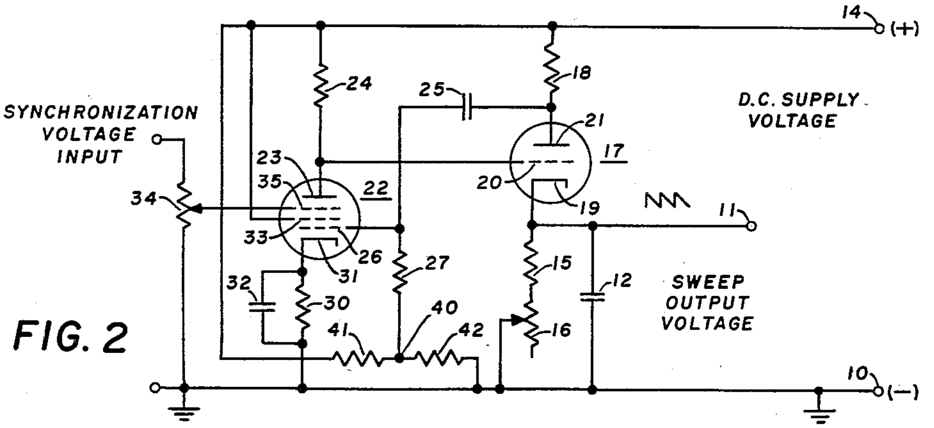
Fig. 2 is a simplified schematic view of a modified form of the invention.

Referring to Fig. 2 of the drawings, a modified form of the invention is shown with which a desired relative bias condition for the control tube 22 may be obtained. All circuit elements which are the same as described in connection with Fig. 1 of the drawings will be given the same reference numerals on Fig. 2 of the drawings and will not be again described. As shown by Fig. 2, the control electrode 26 of the control tube 22 is returned to the junction point 40 or tap between resistors 41 and 42 forming a voltage divider and connected in series between the positive and negative terminals 14, 10 of the direct current voltage supply. Thus, minor variations in supply voltage will cause a corresponding variation in grid to cathode bias relations for the control tube 22 tending to further stabilize the quiescent anode voltage of tube 22 over such variations of voltage supply. Also, the effect on frequency of variations in the transconductance or the grid voltage vs. plate current characteristic of tube 22 will be minimized, because of the stabilizing effect upon plate current of the cathode resistor 30 and its associated positive grid return network 41. 42. For still further stabilization, resistor 41 may be returned to a regulated voltage source instead of to supply terminal 14.

Figure 3:
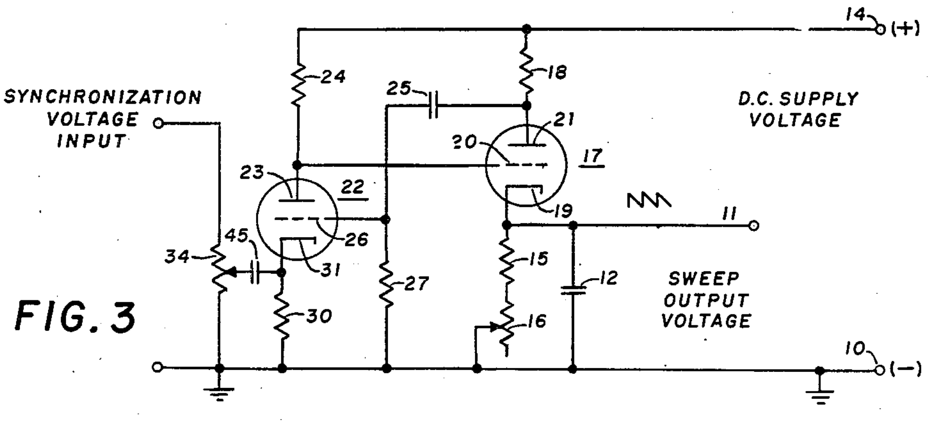
Fig. 3 is a simplified schematic view of a form of the invention similar to that shown in Fig. 1, but providing for synchronization signal injection at the cathode of the control tube.

Referring now to Fig. 3 of the drawings, another modification of the invention as previously described in connection with Fig. 1 is shown. In this form of the invention the control tube 22 may be a triode and the synchronization signal injection is therefore connected through the potentiometer and isolating capacitor 45 to the cathode electrode 31. With this form of synchronization injection, it may not be desirable to by-pass the self-bias resistance 30, and therefore the capacitor shown at 32 in Figs. 1 and 2 of the drawings is omitted.

Figure 4:
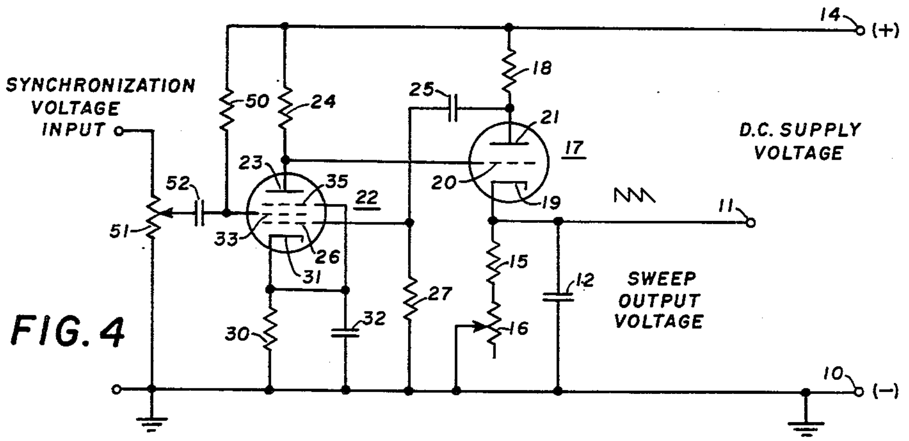
Fig. 4 shows another modification of the invention wherein the synchronization signal is injected at the screen electrode of the control tube.

Yet another modified form of the invention is shown by Fig. 4 of the drawings wherein the synchronization signal is shown to be injected at the screen electrode 33 of the control tube 22. A screen signal isolating resistance 50 is connected between the screen electrode 33 and the positive terminal 14 of the direct current voltage supply. The synchronization signal may be applied through the potentiometer 51 and isolating capacitor 52. With this form of the invention, the suppressor electrode 35 is connected directly to the cathode electrode 31.

Figure 5:
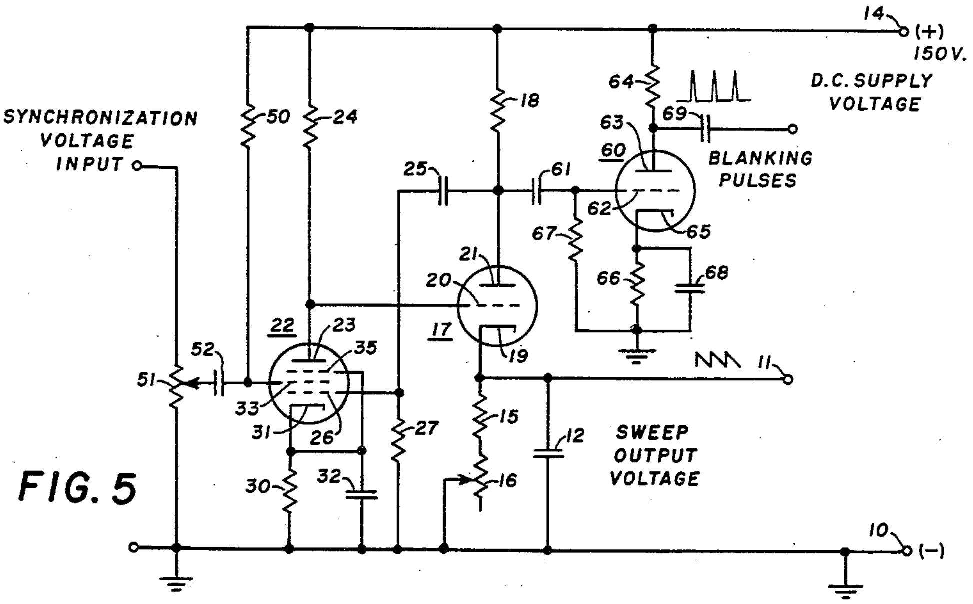
Fig. 5 is a more detailed circuit of a presently preferred form of the invention as intended for use with a cathode-ray oscilloscope.

A presently preferred embodiment of the invention as particularly intended to provide both the sweep voltage and retrace blanking pulses for a cathode ray oscilloscope is shown by Fig. 5 of the drawings. The sweep circuit is essentially the same as shown by Fig. 4 of the drawings as arranged to provide for screen grid electrode synchronization signal injection. The same reference numerals as used for Figs. 1 and 4 of the drawings are used in Fig. 5 for similar circuit components. The sweep output voltage of sawtooth waveform to be applied to the horizontal deflection of the cathode-ray tube appears across the terminals 10, 11 and the capacitor 12. In order to provide retrace blanking pulses of correct polarity for cathode electrode blanking of a cathode-ray tube, an inverter tube 60 is provided. The negative going pulses appearing at the anode 21 of the charging tube 17 are coupled by the capacitor 61 to the control grid 62 of tube 60, and appear as positive going pulses at the anode 63 of this tube. The anode 63 is connected to the positive terminal 14 of the direct current supply through a load resistance 64. The cathode 65 and control grid 62 are returned to the negative terminal 10 of the direct current source through respective resistances 66, 67, and the cathode bias resistance 66 is by-passed by a capacitor 68, as is conventional. A peaking capacitor 69 may be connected in the circuit of the blanking pulse output, as shown, for connection to the cathode of the cathode-ray tube (not shown).

With a direct current supply voltage of approximately 150 volts and using a type 6CB6 tube for the control tube 22 and the respective triode halves of a twin triode tube type 12AT7 for the charging and inverter tubes 17 and 60, the following listed component values will provide a stable range of sweep signal frequency output between three cycles per second and one megacycle per second.

| | |
|---|---|
| Capacitor **12** | 33 mmf. to 2 mf. (adjustable). |
| Resistance **15** | 47,000 ohms. |
| Resistance **16** | 1 megohm rheostat. |
| Resistance **18** | 1000 ohms. |
| Resistance **24** | 10,000 ohms. |
| Capacitor **25** | .05 microfarad. |
| Resistance **27** | 470,000 ohms. |
| Resistance **30** | 330 ohms. |
| Capacitor **32** | .002 microfarad. |
| Resistance **50** | 10,000 ohms. |
| Resistance **51** | 100,000 ohm potentiometer. |
| Capacitor **52** | 2 microfarads. |
| Capacitor **61** | .01 microfarad. |
| Resistance **64** | 10,000 ohms. |
| Resistance **66** | 470 ohms. |
| Resistance **67** | 3.3 megohms. |
| Capacitor **68** | .001 microfarad. |

Figure 6:
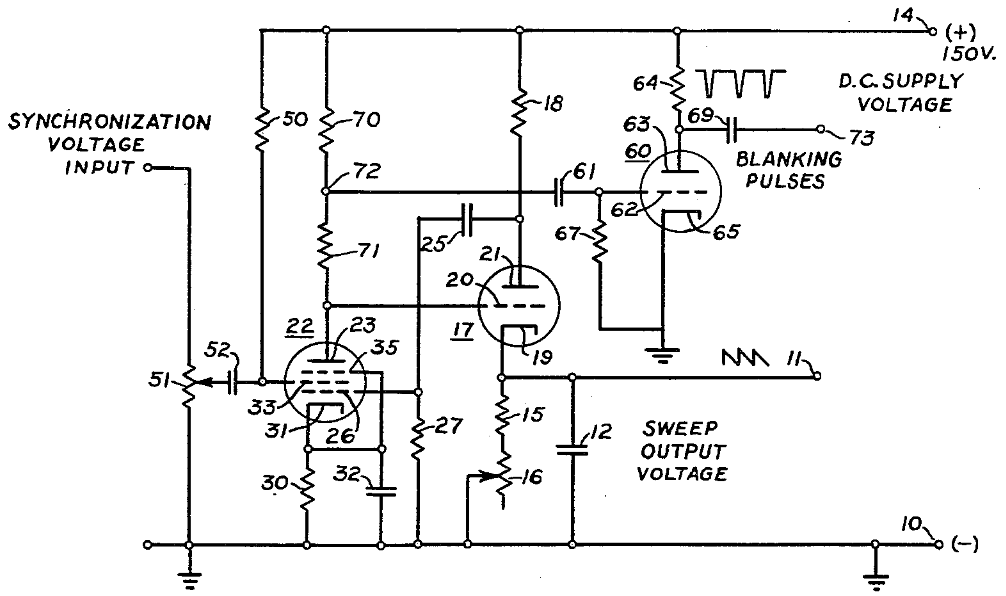
Fig. 6 is a modification of the circuit shown in Fig. 5.

In the modification shown in Fig. 6, the grid of blanking amplifier 60 is fed from the plate circuit of control tube 22 instead of tube 17, whereby negative blanking pulses are obtained at the plate of tube 60, suitable for application to the grid of a cathode-ray tube. The positive going pulses appearing at the anode 21 of control tube 22 are coupled to the grid 62 of the blanking amplifier tube 60 through a capacitor 61. The plate load resistance of control tube 22 may be split into two sections 70, 71 with coupling capacitor 61 connected to their junction 72. This connection provides optimum signal excitation for blanking amplifier tube 60, a low source impedance to its grid 62, and minimum capacitive loading on the plate circuit of control tube 22. The two last-mentioned functions of this tap connection 72 operate to reduce retrace time and to sharpen the blanking pulses. The positive going pulses appearing at the junction 72 are amplified by tube 60 and appear as negative going pulses at its anode 63. This anode 63 is connected through a coupling capacitor 69 to a terminal 73, which is to be connected to the intensity-control grid of a cathode-ray tube (not shown). The remainder of the circuit associated with tube 60 is conventional, comprising a grid resistor 67 and a plate load resistor 64, connected to the positive plate supply terminal 14. The cathode 65 of tube 60 may be connected to ground, as shown, or may be connected to ground through a self-bias resistor shunted by a small capacitor.

*Table of values for modification of Fig. 6*

| | |
|---|---|
| Capacitor 12 | 33 mmf. to 2 mf. (adjustable). |
| Resistance 15 | 47,000 ohms. |
| Resistance 16 | 1 megohm rheostat. |
| Resistance 18 | 1000 ohms. |
| Capacitor 25 | .05 microfarad. |
| Resistance 27 | 470,000 ohms. |
| Resistance 30 | 330 ohms. |
| Capacitor 32 | .002 microfarad. |
| Resistance 50 | 10,000 ohms. |
| Resistance 51 | 100,000 ohm potentiometer. |
| Capacitor 52 | 2 microfarads. |
| Capacitor 61 | .01 microfarad. |
| Resistance 64 | 10,000 ohms. |
| Resistance 67 | 22 megohms. |
| Capacitor 69 | .05 microfarad. |
| Resistance 70 | 10,000 ohms. |
| Resistance 71 | 2700 ohms. |

There has been described above an improved form of cathode-ray oscilloscope sweep generator for producing an output signal of sawtooth waveform. According to the invention, improved frequency stability is obtained by the use of a self-biasing circuit for the control tube 22 to make the quiescent anode voltage of such tube substantially constant over minor variations of operating potentials. Additional control may also be obtained by providing a positive bias for the control electrode of the control tube in combination with the self-bias circuit of the invention. When desired, the retrace time also may be shortened by providing a capacitor by-pass for the self-bias circuit of the control tube.

Various modifications may be made within the spirit of the invention and the scope of the appended claims.

I claim:

1. A sweep oscillator for generating a sweep voltage of sawtooth waveform comprising, a capacitor to be charged to provide the sweep voltage output, a resistance connected in parallel with said capacitor, a source of direct current having positive and negative terminals, a capacitor charging tube, said charging tube having at least a cathode, control electrode, and anode, the anode of said charging tube being connected in series with an anode resistance to the positive terminal of said source and the cathode of said charging tube being connected to one terminal of said capacitor, the other terminal of said capacitor being connected to the negative terminal of said source, a control tube having at least cathode, control and anode electrodes, the anode electrode of said control tube being connected in series with an anode resistance to the positive terminal of said source and the cathode electrode of said control tube being connected in series with a self-bias resistance to the negative terminal of said source, means providing a direct connection between the anode of said control tube and the control electrode of said charging tube, and means coupling the anode of said charging tube to the control electrode of said control tube whereby said capacitor is rapidly charged to a maximum voltage at which said charging tube is cut off and is linearly discharged to a minimum voltage at which said charging tube again becomes conductive to rapidly charge said capacitor again to the maximum voltage, said control tube being conductive when said charging tube is cut off and being cut off when said charging tube is conducting, the value of said bias resistance being such as to stabilize the potential of the charging tube control electrode and prevent variations in output frequency with fluctuations in the direct current source voltage.

2. A variable frequency sweep oscillator for generating a sweep voltage of sawtooth waveform comprising, a capacitor to be charged to provide the sweep voltage output, a resistance connected in parallel with said capacitor, said capacitor and said resistance having a known time constant, means to vary the time constant of said capacitor resistance network for varying the output frequency of said oscillator, a source of direct current having positive and negative terminals, a capacitor charging tube, said charging tube having at least a cathode, control electrode, and anode, the anode of said charging tube being connected in series with an anode resistance to the positive terminal of said source and the cathode of said charging tube being connected to one terminal of said capacitor, the other terminal of said capacitor being connected to the negative terminal of said source, a control tube having at least cathode, control, and anode electrodes, the anode electrode of said control tube being connected in series with an anode resistance to the positive terminal of said source and the cathode electrode of said control tube being connected in series with a self-bias resistance to the negative terminal of said source, means providing a direct connection between the anode of said control tube and the control electrode of said charging tube, and means coupling the anode of said charging tube to the control electrode of said control tube whereby said capacitor is rapidly charged to a maximum voltage at which said charging tube is cut off and is linearly discharged to a minimum voltage at which said charging tube again becomes conductive to rapidly charge said capacitor again to the maximum voltage, said control tube being conductive when said charging tube is cut off and being cut off when said charging tube is conducting, the value of said bias resistance being such as to stabilize the quiescent anode voltage of said control tube.

3. A sweep oscillator for generating a sweep voltage of sawtooth waveform comprising, a first capacitor to be charged to provide the sweep voltage output, a resistance connected in parallel with said first capacitor, a source of direct current having positive and negative terminals, a capacitor charging tube, said charging tube having at least a cathode, control electrode, and anode, the anode of said charging tube being connected in series with an anode resistance to the positive terminal of said source and the cathode of said charging tube being connected to one terminal of said first capacitor, the other terminal of said first capacitor being connected to the negative terminal of said source, a control tube having at least cathode, control and anode electrodes, the anode electrode of said control tube being connected in series with an anode resistance to the positive terminal of said source and the cathode electrode of said control tube being connected in series with a self-bias resistance to the negative terminal of said source, a by-pass capacitor connected in parallel with said bias resistance, means providing a direct connection between the anode of said control tube and the control electrode of said charging tube, and means coupling the anode of said charging tube to the control electrode of said control tube whereby said first capacitor is rapidly charged to a maximum voltage at which said charging tube is cut off and is linearly discharged to a minimum voltage at which said charging tube again becomes conductive to rapidly charge said first capacitor again to the maximum voltage, said control tube being conductive when said charging tube is cut off and being cut off when said charging tube is conducting, the value of said bias resistance being such as to stabilize the potential of the control electrode of the charging tube when the latter is cut off, and said by-pass capacitor having a value to cause said control tube to rapidly become non-conductive as said charging tube becomes conductive to thereby increase the conductivity of said charging tube and shorten the total time to charge the first capacitor.

4. A variable frequency sweep oscillator for generating a sweep voltage of sawtooth waveform comprising, a first capacitor to be charged to provide the sweep voltage output, a resistance connected in parallel with said first capacitor, said first capacitor and said resistance having a known time constant, means to vary the time constant of said capacitor resistance network for varying the output frequency of said oscillator, a source of direct current having positive and negative terminals, a capacitor charging tube, said charging tube having at least a cathode, control electrode, and anode, the anode of said charging tube being connected in series with an anode resistance to the positive terminal of said source and the cathode of said charging tube being connected to one terminal of said first capacitor, the other terminal of said first capacitor being connected to the negative terminal of said source, a control tube having at least cathode, control and anode electrodes, the anode electrode of said control tube being connected in series with an anode resistance to the positive terminal of said source and the cathode electrode of said control tube being connected in series with a self-bias resistance to the negative, a by-pass capacitor connected in parallel with said bias resistance, means providing a direct connection between the anode of said control tube and the control electrode of said charging tube, and means coupling the anode of said charging tube to the control electrode of said control tube whereby said first capacitor is rapidly charged to a maximum voltage at which said charging tube is cut off and is linearly discharged to a minimum voltage at which said charging tube again becomes conductive to rapidly charge said first capacitor again to the maximum voltage, said control tube being conductive when said charging tube is cut off and being cut off when said charging tube is conducting, the value of said bias resistance being such as to stabilize the potential on the control electrode of said charging tube when the latter is cut off, and said by-pass capacitor having a value to cause said control tube to rapidly become non-conductive as said charging tube becomes conductive to thereby increase the conductivity of said charging tube and shorten the total time to charge the first capacitor.

5. A sweep oscillator for generating a sweep voltage of sawtooth waveform comprising, a capacitor to be charged to provide the sweep voltage output, a resistance connected in parallel with said capacitor, a source of direct current having positive and negative terminals, a capacitor charging tube, said charging tube having at least a cathode, control electrode, and anode, the anode of said charging tube being connected in series with an anode resistance to the positive terminal of said source and the cathode of said charging tube being connected to one terminal of said capacitor, the other terminal of said capacitor being connected to the negative terminal of said source, a control tube having at least cathode, control and anode electrodes, the anode electrode of said control tube being connected in series with an anode resistance to the positive terminal of said source and the cathode electrode of said control tube being connected in series with a self-bias resistance to the negative terminal of said source, a voltage divider connected between said positive and negative terminals, means connecting the control electrode of said control tube to a tap of said voltage divider, means providing a direct connection between the anode of said control tube and the control electrode of said charging tube, and means coupling the anode of said charging tube to the control electrode of said control tube whereby said capacitor is rapidly charged to a maximum voltage at which said charging tube is cut off and linearly discharged to a minimum voltage at which said charging tube again becomes conductive to rapidly charge said capacitor again to the maximum voltage, said control tube being conductive when said charging tube is cut off and being cut off when said charging tube is conducting, the value of said bias resistance being such as to stabilize the potential on the control electrode of said charging tube when the latter is non-conductive and thus to hold the operating frequency constant.

6. A sweep oscillator for generating a sweep voltage of sawtooth waveform comprising, a first capacitor to be charged to provide the sweep voltage output, a resistance connected in parallel with said first capacitor, a source of direct current having positive and negative terminals, a capacitor charging tube, said charging tube having at least a cathode, control electrode, and anode, the anode of said charging tube being connected in series with an anode resistance to the positive terminal of said source and the cathode of said charging tube being connected to one terminal of said first capacitor, the other terminal of said first capacitor being connected to the negative terminal of said source, a control tube having at least cathode, control and anode electrodes, the anode electrode of said control tube being connected in series with an anode resistance to the positive terminal of said source and the cathode electrode of said control tube being connected in series with a self-bias resistance to the negative terminal of said source, a by-pass capacitor connected in parallel with said bias resistance, a voltage divider connected between said positive and negative terminals, means connecting the control electrode of said control tube to a tap of said voltage divider, means providing a direct connection between the anode of said control tube and the control electrode of said charging tube, and means coupling the anode of said charging tube to the control electrode of said control tube whereby said first capacitor is rapidly charged to a maximum voltage at which said charging tube is cut off and is linearly discharged to a minimum voltage at which said charging tube again becomes conductive to rapidly charge said first capacitor again to the maximum voltage, said control tube being conductive when said charging tube is cut off and being cut off when said charging tube is conducting, the value of said bias resistance being such as to stabilize the potential on the control electrode of said charging tube when the latter is cut off, and said by-pass capacitor having a value to cause said control tube to rapidly become non-conductive as said charging tube becomes conductive to thereby increase the conductivity of said charging tube and shorten the total time to charge the first capacitor.

7. A variable frequency sweep oscillator for generating a sweep voltage of sawtooth waveform comprising, a capacitor to be charged to provide the sweep voltage output, a resistance connected in parallel with said capacitor, said capacitor and said resistance having a known time constant, means to vary the time constant of said capacitor resistance network for varying the output frequency of said oscillator, a source of direct current having positive and negative terminals, a capacitor charging tube, said charging tube having at least a cathode, control electrode, and anode, the anode of said charging tube being connected in series with an anode resistance to the positive terminal of said source and the cathode of said charging tube being connected to one terminal of said capacitor, the other terminal of said capacitor being connected to the negative terminal of said source, a control tube having at least cathode, control and anode electrodes, the anode electrode of said control tube being connected in series with an anode resistance to the positive terminal of said source and the cathode electrode of said control tube being connected in series with a self-bias resistance to the negative terminal of said source, a voltage divider connected between said positive and negative terminals, means connecting the control electrode of said control tube to a tap of said voltage divider, means providing a direct connection between the anode of said control tube and the control electrode of said charging tube, and means coupling the anode of said charging tube to the control electrode of said control tube whereby said capacitor is rapidly charged to a maximum voltage at which said charging tube is cut off and is linearly discharged to a minimum voltage at which said charging tube again becomes conductive to rapidly charge said capacitor again to the maximum voltage, said control tube being conductive when said charging tube is cut off and being cut off when said charging tube is conducting, the value of said bias resistance being such as to stabilize the potential on the control electrode of said charging tube when the latter is non-conductive and thus to hold the operating frequency constant.

8. A variable frequency sweep oscillator for generating a sweep voltage of sawtooth waveform comprising, a first capacitor to be charged to provide the sweep voltage output, a resistance connected in parallel with said first capacitor, said capacitor and said resistance having a known time constant, means to vary the time constant of said capacitor resistance network for varying the output frequency of said oscillator, a source of direct current having positive and negative terminals, a capacitor charging tube, said charging tube having at least a cathode, control electrode, and anode, the anode of said charging tube being connected in series with an anode resistance to the positive terminal of said source and the cathode of said charging tube being connected to one terminal of said first capacitor, the other terminal of said first capacitor being connected to the negative terminal of said source, a control tube having at least cathode, control and anode electrodes, the anode electrode of said control tube being connected in series with an anode resistance to the positive terminal of said source and the cathode electrode of said control tube being connected in series with a self-bias resistance to the negative terminal of said source, a by-pass capacitor connected in parallel with said bias resistance, a voltage divider connected between said positive and negative terminals, means connecting the control electrode of said control tube to a tap of said voltage divider, means providing a direct connection between the anode of said control tube and the control electrode of said charging tube, and means coupling the anode of said charging tube to the control electrode of said control tube whereby said first capacitor is rapidly charged to a maximum voltage at which said charging tube is cut off and is linearly discharged to a minimum voltage at which said charging tube again becomes conductive to rapidly charge said first capacitor again to the maximum voltage, said control tube being conductive when said charging tube is cut off and being cut off when said charging tube is conducting, the value of said bias resistance being such as to stabilize the potential on the control electrode of said charging tube when the latter is cut off, and said by-pass capacitor having a value to cause said control tube to rapidly become non-conductive as said charging tube becomes conductive to thereby increase the conductivity of said charging tube and shorten the total time to charge said first capacitor.

9. A variable frequency sweep oscillator for generating a cathode-ray oscilloscope sweep voltage of sawtooth waveform comprising, a capacitor to be charged to provide the sweep voltage output, a resistance connected in parallel with said capacitor, said capacitor and said resistance having a known time constant, means to vary the time constant of said capacitor resistance network for varying the output frequency of said oscillator, a source of direct current having positive and negative terminals, a capacitor charging tube, said charging tube having at least a cathode, control electrode and anode, the anode of said charging tube being connected in series with an anode resistance to the positive terminal of said source and the cathode of said charging tube being connected to one terminal of said capacitor, the other terminal of said capacitor being connected to the negative terminal of said source, a control tube of the multi-grid type having at least cathode, control, suppressor and anode electrodes, the anode electrode of said control tube being connected in series with an anode resistance to the positive terminal of said source and the cathode electrode of said control tube being connected in series with a self-bias resistance to the negative terminal of said source, means providing a direct connection between the anode of said control tube and the control electrode of said charging tube, means to couple a synchronizing signal to the suppressor electrode of said control tube, and means coupling the anode of said charging tube to the control electrode of said control tube whereby said capacitor is rapidly charged to a maximum voltage at which said charging tube is cut-off and is linearly discharged to a minimum voltage at which said charging tube again becomes conductive to rapidly charge said capacitor again to the maximum voltage thereby producing a sweep voltage of linear waveform during the discharge of said capacitor, said control tube being conductive when said charging tube is cut off and being cut off when said charging tube is conducting, the value of said bias resistance being such as to stabilize the potential on the control electrode of said charging tube when the latter is non-conductive and thus to hold the operating frequency constant.

10. A variable frequency sweep oscillator for generating a cathode-ray oscilloscope sweep voltage of sawtooth waveform comprising, a capacitor to be charged to provide the sweep voltage output, a resistance connected in parallel with said capacitor, said capacitor and said resistance having a known time constant, means to vary the time constant of said capacitor resistance network for varying the output frequency of said oscillator, a source of direct current having positive and negative terminals, a capacitor charging tube, said charging tube having at least a cathode, control electrode, and anode, the anode of said charging tube being connected in series with an anode resistance to the positive terminal of said source and the cathode of said charging tube being connected to one terminal of said capacitor, the other terminal of said capacitor being connected to the negative terminal of said source, a control tube of the multi-grid type having at least cathode, control, screen and anode electrodes, the anode electrode of said control tube being connected in series with an anode resistance to the positive terminal of said source and the cathode electrode of said control tube being connected in series with a self-bias resistance to the negative terminal of said source, means providing a direct connection between the anode of said control tube and the control electrode of said charging tube, means to couple a synchronizing signal to the screen electrode of said control tube, and means coupling the anode of said charging tube to the control electrode of said control tube whereby said capacitor is rapidly charged to a maximum voltage at which said charging tube is cut off and is linearly discharged to a minimum voltage at which said charging tube again becomes conductive to rapidly charge said capacitor again to the maximum voltage thereby producing a sweep voltage of linear waveform during the discharge of said capacitor, said control tube being conductive when said charging tube is cut off and being cut off when said charging tube is conducting, the value of said bias resistance being such as to stabilize the potential on the control electrode of said charging tube when the latter is non-conductive and thus to hold the operating frequency constant.

11. A variable frequency sweep oscillator for generating a cathode-ray oscilloscope sweep voltage of sawtooth waveform comprising, a capacitor to be charged to provide the sweep voltage output, a resistance connected in parallel with said capacitor, said capacitor and said resistance having a known time constant, means to vary the time constant of said capacitor resistance network for varying the output frequency of said oscillator, a source of direct current having positive and negative terminals, a capacitor charging tube, said charging tube having at least a cathode, control electrode, and anode, the anode of said charging tube being connected in series with an anode resistance to the positive terminal of said source and the cathode of said charging tube being connected to one terminal of said capacitor, the other terminal of said capacitor being connected to the negative terminal of said source, a control tube having at least cathode, control and anode electrodes, the anode electrode of said control tube being connected in series with an anode resistance to the positive terminal of said source and the cathode electrode of said control tube being connected in series with a self-bias resistance to the negative terminal of said source, means providing a direct connection between the anode of said control tube and the control electrode of said charging tube, means to couple a synchronizing signal to the cathode electrode of said control tube, and means coupling the anode of said charging tube to the control electrode of said control tube whereby said capacitor is rapidly charged to a maximum voltage at which said charging tube is cut off and is linearly discharged to a minimum voltage at which said charging tube again becomes conductive to rapidly charge said capacitor again to the maximum voltage thereby producing a sweep voltage of linear waveform during the discharge of said capacitor, said control tube being conductive when said charging tube is cut off and being cut off when said charging tube is conducting, the value of said bias resistance being such as to stabilize the potential on the control electrode of said charging tube when the latter is non-conductive and thus to hold the operating frequency constant.

12. A variable frequency sweep oscillator for generating a cathode-ray oscilloscope sweep voltage of sawtooth waveform comprising, a first capacitor to be charged to provide the sweep voltage output, a resistance connected in parallel with said first capacitor, said first capacitor and said resistance having a known time constant, means to vary the time constant of said capacitor resistor network for varying the output frequency of said oscillator, a source of direct current having positive and negative terminals, a capacitor charging tube, said charging tube having at least a cathode, control electrode and anode, the anode of said charging tube being connected in series with an anode resistance to the positive terminal of said source and the cathode of said charging tube being connected to one terminal of said first capacitor, the other terminal of said first capacitor being connected to the negative terminal of said source, a control tube of the multi-grid type having at least cathode, control, screen and anode electrodes, the anode electrode of said control tube being connected in series with an anode resistance to the positive terminal of said source and the cathode electrode of said control tube being connected in series with a self-bias resistance to the negative terminal of said source, a by-pass capacitor connected in parallel with said bias resistance, means providing a direct connection between the anode of said control tube and the control electrode of said charging tube, means to couple a synchronizing signal to the screen electrode of said control tube, and means coupling the anode of said charging tube to the control electrode of said control tube whereby said first capacitor is rapidly charged to a maximum voltage at which said charging tube is cut off and is linearly discharged to a minimum voltage at which said charging tube again becomes conductive to rapidly charge said first capacitor again to the maximum voltage thereby producing a sweep voltage of linear waveform during the discharge of said first capacitor, said control tube being conductive when said charging tube is cut off and being cut off when said charging tube is conducting, the value of said bias resistance being such as to stabilize the potential on the control electrode of said charging tube when the latter is cut off, and the value of said by-pass capacitor being such as to cause said control tube to become rapidly non-conductive as said charging tube becomes conductive to thereby shorten the charging time of said first capacitor.

References Cited in the file of this patent

UNITED STATES PATENTS

| | | |
|---|---|---|
| 2,423,931 | Etter | July 15, 1947 |
| 2,662,981 | Segerstrom | Dec. 15, 1953 |